3,037,999
ORGANOMETALLIC COMPOUNDS
Kryn G. Ihrman, Farmington, Mich., and Thomas H. Coffield, Heidelberg, Germany, assignors to Ethyl Corporation, New York, N.Y., a corporation of Delaware
No Drawing. Filed Nov. 20, 1959, Ser. No. 854,232
5 Claims. (Cl. 260—439)

This invention relates to novel organometallic compounds and their mode of preparation. More specifically, this invention relates to cycloheptatriene metal carbonyl compounds of iron, ruthenium and osmium wherein the metal atom is bonded to a cycloheptatriene molecule and in addition is bonded to a plurality of carbonyl groups.

It is an object of this invention to provide a novel class of cycloheptatriene metal carbonyl compounds of iron, ruthenium and osmium. A further object is to provide a process for the preparation of these compounds. Additional objects of this invention will become apparent from a reading of the specification and claims which follow.

The objects of this invention are accomplished by providing compounds represented by the following formula:

$$QM(CO)_3$$

wherein Q is a cycloheptatriene molecule, and M is an iron group transition metal, i.e., iron, ruthenium and osmium. In the above formula, the cycloheptatriene molecule, represented by Q, donates four electrons to the metal atom, M, and each carbonyl group donates two electrons to the metal. By virtue of the electrons donated to the metal atom, it achieves an electron configuration which is iso-electronic with that of the next higher inert gas in the periodic table.

The cycloheptatriene molecule, Q, in the above formula, has the following structural configuration

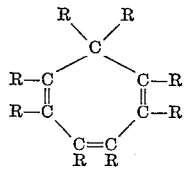

wherein each of the R groups may be the same or different and is selected from the group consisting of hydrogen and monovalent hydrocarbon radicals containing from one to about eight carbon atoms. Typical of such monovalent hydrocarbon radicals are alkyl, aryl, cycloalkyl, alkenyl, cycloalkenyl, aralkyl and alkaryl radicals. Typical of these radicals are methyl, propyl, phenyl, tertbutyl, p-chlorophenyl, neo-pentyl, chloromethyl, octyl, cyclohexyl, propenyl, cyclopentyl, cyclopentenyl, cyclopropyl, 2-methyl-2-butenyl, cyclohexenyl, benzyl, 2-phenylethyl, p-ethylphenyl, 2,4-dimethylphenyl and tolyl.

Preferred substituent groups, R, are hydrogen and monovalent aliphatic hydrocarbon groups containing from one to about eight carbon atoms. It is further preferred that the sum of the carbon atoms in all of the R substituent groups does not exceed ten. When this preference is satisfied, the compounds have superior physical characteristics rendering them of greatest utility as additives to hydrocarbon fuels.

The metal, M, in the above formula, is a metal of the iron group, i.e., iron, ruthenium and osmium. Preferably, M is iron since those of our compounds containing iron have the most desirable physical and chemical characteristics for use as additives to petroleum fuels of the gasoline boiling range.

Typical of the compounds of our invention are methyl-cycloheptatriene iron tricarbonyl, propyl-cycloheptatriene ruthenium tricarbonyl, dimethyl-octyl-cycloheptatriene osmium tricarbonyl, ethyl-isopropyl-cycloheptatriene iron tricarbonyl, pentamethyl-cycloheptatriene ruthenium tricarbonyl, benzyl-cycloheptatriene osmium tricarbonyl, cyclopentyl-cycloheptatriene iron tricarbonyl, chloromethyl-cycloheptatriene ruthenium tricarbonyl, p-ethylphenyl-cycloheptatriene osmium tricarbonyl, cyclopropenyl-cycloheptatriene iron tricarbonyl and the like.

The compounds of the invention are produced by the reaction of a cycloheptatriene compound with a metal carbonyl, both as defined above. In this reaction, the cycloheptatriene compound displaces two carbon monoxide groups from the metal carbonyl reactant to form a cycloheptatriene metal carbonyl compound in which there are two less carbonyl groups than were present in the original metal carbonyl.

In general, the process may be carried out at temperatures between about 75 to about 200° C. Preferably, however, temperatures from about 100 to about 150° C. are employed since, within this range, relatively higher yields are obtained with a minimum of undesirable side reactions. The pressure under which the process is carried out is not critical. Preferably, however, the process is conducted at atmospheric pressure or slightly higher although higher pressures, up to 500 atmospheres, can be employed if desired.

The process is generally conducted under a blanketing atmosphere of an inert gas such as nitrogen, helium, argon and the like.

The process may be conducted in the presence of a non-reactive solvent. The nature of the solvent is not critical and in fact, the cycloheptatriene reactant may in some cases be used in sufficient excess to serve as a reaction solvent.

Typical of reaction solvents which may be employed in our process are high boiling saturated hydrocarbons such as n-octane, n-decane, and other paraffinic hydrocarbons having up to about 20 carbon atoms such as eicosane, pentadecane, and the like. Aromatic solvents such as mesitylene, toluene, xylene, and anisole may also be employed. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysilioxanes, hexapropyldisilane and diethyldipropyldiphenyldisilane may also be employed. Other ester solvents are those derived from succinic, maleic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sabacate, di-(methylcyclohexyl) adipate and the like. Of these enumerated solvents, those which are preferred for use in the process are the high boiling ethers and saturated aliphatic hydrocarbons. All of the above solvents will not be suitable for all of the specific embodiments of the invention since certain of the metal carbonyl reactants are relatively insoluble in some of the above solvents. Thus, care should be used in selecting the specific solvent for the specific reaction.

The particular solvent employed in any embodiment of the process should be selected from those solvents having the requisite boiling and/or freezing point. Frequently the boiling point of the solvent is used to control the reaction temperature when the process is carried out at atmospheric pressure. In such cases, the reaction mixture is heated at reflux, and the reflux temperature is determined by the boiling point of the solvent. The ease of separating the product from the solvent depends on the degree of difference between the boiling and/or freezing points of the product and the solvent. If the product is a liquid having a boiling point close to that of the solvent, it is obvious that separation will be difficult. In order to avoid this, it is preferable to select a solvent whose normal boiling point varies by at least 25° C. from the normal boiling point of a liquid product. If, on the other hand, the product is a solid, it is desirable that the freezing point of the solvent be at least 25° C. less than the temperature at which separation of the product is effected through crystallization. Obviously, if the solvent freezes before the solid product precipitates, it will be impossible to make a separation through crystallization.

The above criteria as to physical properties of the solvent are not unique to this process. In any chemical process, it is necessary to pick a solvent whose physical properties make it readily separable from the product being formed. It is deemed, therefore, within the skill of the art to select the most suitable solvent for use in any particular embodiment of the process of the invention.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, however, a time period ranging from about two to about 24 hours is sufficient.

In some cases, the process is advantageously carried out in the presence of ultraviolet light. This tends to decrease the reaction time and give a higher yield of product.

In general, the metal carbonyl reactant employed in the process is more expensive than the cycloheptatriene reactant. In order to insure maximum conversion of the metal carbonyl, it is, therefore, preferred to use excess quantities of the cycloheptatriene. Generally, from about one to about 10 moles of a cycloheptatriene compound are employed for each mole of metal carbonyl reactant since, within this range, a good conversion of the metal carbonyl is obtained. In some cases, the cycloheptatriene reactant may be more expensive than the particular metal carbonyl employed. In these instances, excess carbonyl will be employed to insure complete conversion of the cycloheptatriene compound.

In some cases, hydroquinone or other free radical reaction inhibitors can be employed in the reaction to prevent polymerization of the cycloheptatriene reactant. Their presence is not critical, however, to the success of the reaction. Typical of other applicable free radical inhibitors are p-tert-butyl catechol, p-hydroxy anisole, 4-amino-1-naphthol, chloranil, 2,4-dinitro-chlorobenzene, dithiocarbamate and the like.

To further illustrate the compounds of our invention and their mode of preparation, there are presented the following examples in which all parts and percentages are by weight unless otherwise indicated.

*Example I*

A mixture comprising 9.8 parts of iron pentacarbonyl, 4.6 parts of cycloheptatriene, 28.7 parts of n-nonane and a trace of hydroquinone was heated at reflux, under nitrogen, for seven hours at 118–129° C. During this period, gas evolution was observed, the total volume of which closely approximated that expected from displacement of two of the carbonyl groups in iron pentacarbonyl by cycloheptatriene. The resulting red mixture was filtered to remove any metallic residue, and the filtrate was placed under vacuum to remove volatile unreacted starting materials. The oily residue was chromatographed on alumina using petroleum ether (37–43° C. B.P.) as the eluant. The yellow-colored eluate was evaporated to yield an orange oil which was cycloheptatriene iron tricarbonyl. The infra-red spectrum of the orange oil showed metallocarbonyl bands at 4.9 and 5.1 microns and carbon-hydrogen stretching at 3.3, 3.5 and 3.6 microns. The oil was further distilled at one mm. Hg and 50° C. to prepare a sample which was given an elemental analysis. Found: C, 52.5; H, 3.77 and Fe, 24.1. Calculated for $$C_7H_8Fe(CO)_3$$

C, 51.8; H, 3.45 and Fe, 24.1 percent.

*Example II*

A mixture comprising 29.4 parts of iron pentacarbonyl, 13.6 parts of cycloheptatriene and 86.1 parts of n-nonane was heated at reflux, with stirring, for six hours under nitrogen. During this period, a steady evolution of gas was observed. The reaction mixture was then cooled in a nitrogen atmosphere and left to stand for approximately two days. The reaction mixture was again heated at reflux for an additional eight hours during which time additional evolution of gas was observed. The total evolution of gas observed was precisely that calculated for a displacement of two of the carbon monoxide groups in the iron pentacarbonyl reactant by cycloheptatriene. The reaction mixture was then cooled, filtered, and the solvent was removed by placing the filtrate under vacuum. The resulting red-colored oil was thoroughly distilled to yield 18.3 parts of cycloheptatriene iron tricarbonyl. An analytical sample of the product was prepared by further fractionation. This sample boiled at 70° C. under a pressure of 3 mm. Hg. On analysis, there was found: C, 52.1; H, 3.7; Fe, 24.2 and O, 20.8 percent. Calculated for $C_7H_8Fe(CO)_3$: C, 51.8; H, 3.45; Fe, 24.1 and O, 20.7 percent.

When the preceding example is repeated at a reaction temperature of 100° C. and atmospheric pressure, or under slight pressure at 150° C., good yields of cycloheptatriene iron tricarbonyl are obtained.

*Example III*

A solution comprising 0.25 mole of ruthenium pentacarbonyl and 0.35 mole of octylcycloheptatriene dissolved in diethylene glycol dimethyl ether is heated at reflux for 24 hours under nitrogen. The reaction mixture is then discharged from the reaction vessel and filtered. Excess solvent and volatile unreacted starting materials are removed from the filtrate by heating under vacuum, and the residue is dissolved in low-boiling petroleum ether and chromatographed on alumina. The eluate is heated in vacuo to remove the petroleum ether and give a good yield of octylcycloheptatriene ruthenium tricarbonyl.

*Example IV*

A mixture comprising 0.1 mole of osmium pentacarbonyl and 1.0 mole of methylcycloheptatriene is heated at reflux for 20 hours under nitrogen. The reaction product is discharged, filtered, and excess methylcycloheptatriene is removed from the filtrate by heating under vacuum. The residue is dissolved in low-boiling petroleum ether and chromatographed on alumina to yield an eluate which, when heated in vacuo, gives a good yield of methylcycloheptatriene osmium tricarbonyl.

*Example V*

One tenth mole of 2,4-diethylphenyl cycloheptatriene and 0.1 mole of iron pentacarbonyl are dissolved in pentyl butanoate. The resulting solution is heated at reflux for two hours under nitrogen after which the reaction product is discharged from the reaction vessel and filtered. The solvent is removed from the filtrate by heating in vacuo, and there is obtained from the residue, by means of chromatographic separation, a good yield of 2,4-diethylphenyl cycloheptatriene iron tricarbonyl.

*Example VI*

A solution comprising 0.15 mole of chloromethyl cycloheptatriene and 0.07 mole of ruthenium pentacarbonyl dissolved in mesitylene is heated at reflux under nitrogen for three hours. The reaction product is then discharged, filtered, and solvent is removed from the filtrate by heating in vacuo. The residue is dissolved in low-boiling petroleum ether and chromatographed on alumina. On removing the solvent from the eluate by heating in vacuum, there is obtained chloromethyl cycloheptatriene ruthenium tricarbonyl.

*Example VII*

A solution comprising 0.03 mole of trimethylcycloheptatriene and 0.03 mole of osmium pentacarbonyl dissolved in n-nonane is heated at reflux for 10 hours under nitrogen. The reaction product is discharged and filtered, and the solvent is removed from the filtrate by heating in vacuo. On dissolving the residue in low-boiling petroleum ether, chromatographing on alumina and heating the eluate in vacuo, there is obtained a good yield of trimethylcycloheptatriene osmium tricarbonyl.

The compounds of this invention are useful antiknocks when added to a petroleum hydrocarbon. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock our compounds may be present in the gasoline in combination with typical scavengers such as ethylene dichloride, ethylene dibromide, tricresylphosphate and the like.

The compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operation.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of cycloheptatriene iron tricarbonyl. The tube is heated at 400° C. for one hour after which time it is cooled and opened. The cloth has a uniform metallic grey appearance and exhibits a gain in weight of about 0.03 gram.

The compounds may also be used as additives to distillate fuels such as used in home heating, and as additives to hydrocarbon oils and greases to improve their lubricity.

Having fully described the compounds, their mode of preparation and their many utilities, it is desired that the invention be limited only within the lawful scope of the appended claims.

We claim:

1. Organometallic compounds represented by the formula $QM(CO)_3$, wherein Q is a cycloheptatriene compound having the formula

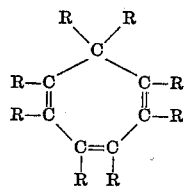

in which R is selected from the group consisting of hydrogen and monovalent hydrocarbon radicals containing from one to about eight carbon atoms, and M is an iron-group transition metal, the metal atom M having an electron configuration which is isoelectronic with that of the next higher inert gas in the periodic table.

2. The compounds of claim 1 wherein M is iron.

3. Cycloheptatriene iron tricarbonyl.

4. Process comprising reacting a cycloheptatriene compound having the formula

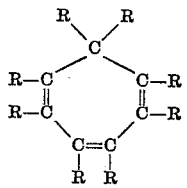

in which R is selected from the group consisting of hydrogen and monovalent hydrocarbon radicals containing from one to about eight carbon atoms, with an iron-group transition metal pentacarbonyl compound.

5. The process of claim 4 wherein the iron-group transition metal carbonyl is iron petacarbonyl.

References Cited in the file of this patent
UNITED STATES PATENTS 2,818,416    Brown et al. _____ Dec. 31, 1957

OTHER REFERENCES

Abel et al.: Proceedings of the Chemical Society, May 1958, pages 152–153.

Burton et al.: Chemistry and Industry, November 29, 1958, page 1592.

Cotton: Progress in Inorganic Chemistry, vol. I, pages 85–110 (1959).